(12) United States Patent
Tsujihara

(10) Patent No.: US 7,290,270 B2
(45) Date of Patent: Oct. 30, 2007

(54) OPTICAL DISK APPARATUS

(75) Inventor: Kazumasa Tsujihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 334 days.

(21) Appl. No.: 11/097,201

(22) Filed: Apr. 4, 2005

(65) Prior Publication Data

US 2005/0233690 A1 Oct. 20, 2005

(30) Foreign Application Priority Data

Apr. 5, 2004 (JP) ............................ P2004-110949

(51) Int. Cl.
*G11B 33/14* (2006.01)
(52) U.S. Cl. .................................................. 720/649
(58) Field of Classification Search ................ 720/649, 720/648, 600; 360/97.02; 369/75.11, 77.11; 454/320
See application file for complete search history.

(56) References Cited

U.S. PATENT DOCUMENTS

| | | | | |
|---|---|---|---|---|
| 5,301,178 | A | * | 4/1994 | Okabe et al. ............... 720/649 |
| 5,493,457 | A | * | 2/1996 | Kawamura et al. ......... 720/648 |
| 5,532,996 | A | * | 7/1996 | Okabe et al. ............... 720/630 |
| 5,557,595 | A | * | 9/1996 | Ishii .......................... 720/649 |
| 6,040,981 | A | * | 3/2000 | Schmitt et al. ............. 361/695 |
| 6,880,162 | B2 | * | 4/2005 | Takagi et al. ............... 720/649 |
| 2003/0058772 | A1 | * | 3/2003 | Takagi et al. .............. 369/75.1 |
| 2006/0123436 | A1 | * | 6/2006 | Tanaka et al. .............. 720/649 |

FOREIGN PATENT DOCUMENTS

| | | |
|---|---|---|
| JP | A-10-172277 | 6/1998 |
| JP | A-2000-3586 | 1/2000 |
| JP | A-2003-249067 | 9/2003 |

* cited by examiner

*Primary Examiner*—Allen Cao
(74) *Attorney, Agent, or Firm*—Morgan, Lewis & Bockius LLP

(57) ABSTRACT

A case body in which a wiring board and a drive unit are held is provided with vent holes and an exhaust hole near which a fan is provided. An air current setting element is made of an air current setting plate added to a fan holder and a transformer mounted on the wiring board. The air current setting plate is provided at the back of the drive unit, and the transformer is positioned between the air current setting plate and drive unit.

5 Claims, 4 Drawing Sheets

OPTICAL DISK APPARATUS

BACKGROUND OF THE INVENTION

1. Field of the Invention

This invention relates to an optical disk apparatus, and more particularly to an optical disk apparatus provided with a fan adapted to generate a cooling air current to occur in the interior of a case body.

2. Description of the Related Art

The techniques for making it difficult to exert the influence of the heat generated by electronic parts upon an optical disk by employing a structure in which the interior of a case housing therein the optical disk and an electronic part-mounted wiring board is divided by an intermediate case member into a first spatial region in which the optical disk is housed and a second spatial region in which the electronic parts are housed, and the techniques for utilizing for the cooling purpose an air current occurring owing to the rotation of the optical disk in the interior of the case have heretofore been known (refer to, for example, JP-A-2003-249067). In addition, the techniques for preventing the overheating of circuit elements mounted on a substrate board, and the techniques for increasing the cooling efficiency in an information processing apparatus have been proposed (refer to, for example, JP-A-2000-3586 or JP-A-10-172277).

Among these techniques, the disk apparatus disclosed in JP-A-2000-3586 is schematically shown in FIG. 6, and the cooling fan-carrying CD-ROM drive, which is disclosed in JP-A-10-172277, in section in FIG. 7. In the disk apparatus disclosed in JP-A-2000-3586, and as shown in FIG. 6, the air enters a vent hole 2 in a front panel 1, passes through an opening provided in a substrate board 3, passes through a space between the substrate board 3 and a unit mechanism 5 thereabove, and is guided to the outside of the disk apparatus as shown by an arrow by a fan 7 provided on an outer surface of a main frame 6. It is said that, according to this disk apparatus, a temperature rise due to the heat generated by the circuit elements provided above the substrate board 3 decreases. In the disk apparatus disclosed in JP-A-10-172277, and as shown in FIG. 7, an air current setting fan frame 10 surrounding a cooling fan 9, which is mounted on one end of a spindle 8 for rotating a CD-ROM disk D, is provided for the same cooling fan 9, the fan frame 10 being provided vertically on an outer surface of a bottom frame 11. It is said that this structure attains an increase in the cooling efficiency in the interior of the information processing apparatus.

However, in the disk apparatus disclosed in JP-A-2003-249067, a natural flow of the air occurring in the interior of the case or an air current occurring due to the rotation of the optical disk is merely utilized for cooling the optical disk. In such a cooling system, the heat generated in the drive unit and the like for the optical disk cannot be held down satisfactorily in some cases.

On the other hand, the optical disk apparatuses disclosed in JP-A-2000-3586 and JP-A-10-172277 are optical disk apparatuses adapted to generate an air current forcibly by rotating a fan. Therefore, it is considered that the quantity of the air used for cooling these optical disk apparatuses becomes large to cause a cooling effect to be heightened as compared with that of the air used for cooling the optical disk apparatus disclosed in JP-A-2003-249067.

However, in the techniques disclosed in JP-A-2000-3586, only the effect of discharging the air inside the main frame 6, which corresponds to the case body, to the outside by the fan fixed to the main frame is displayed. In the techniques disclosed in JP-A-10-172277, only the effect of discharging the air inside the bottom frame 11 to the outside by the cooling fan 9 is displayed owing to the air current setting fan frame 10 provided on the bottom frame 11 corresponding to the case body.

In view of the above, the techniques disclosed in JP-A-2000-3586 and JP-A-10-172277 do not enable the controlling on the inner side of the case body of the path of a flow of the air current occurring in the interior of the case body to be done. Therefore, in a case where a drive unit which generates heat is provided in a predetermined position in the interior of, for example, a case body of an optical disk apparatus with comparatively wide spaces formed on one side or both sides of the drive unit, the following problems arise. In such a case, an air current occurring in the interior of the case body due to the rotation of a fan passes in large quantities through the spaces in which a flow resistance is low on the left and right sides of the drive unit even when the techniques disclosed in the Patent Publication 2 and Patent Publication 3 are applied to this case. Therefore, the air current is not efficiently used for holding down the generation of heat of the drive unit.

Providing as a single part a partition member like an air current setting plate in a predetermined position has heretofore been generally carried out as a means for passing a large quantity of air current through the interior of a drive unit while controlling the air current in the interior thereof. However, when this means is employed, it becomes certainly necessary to secure an extra space for installing the current setting plate, so that the number of parts besides the air current setting plate which are needed to install the air current plate, such as fasteners increases.

SUMMARY OF THE INVENTION

The present invention has been made in view of these problems. The optical disk apparatus according to the invention is based on a concept that an air current in the interior of a case body generated by rotating a fan is controlled by using an air current setting element so that the air current is discharged to the outside of the case body via, especially, the interior of a drive unit. In such a case, the apparatus is formed so that the air current setting element can be provided in a vacant space in the interior of the case body by utilizing a fan holder provided with a fan near an exhaust port in a wall portion of the case body. The present invention aims at providing an optical disk apparatus capable of heightening the cooling effect in the interior of the case body after the rationalization of the parts including the reduction of the number thereof is carried out on the basis of the attainment of the above-mentioned techniques.

The present invention also aims at providing an optical disk apparatus capable of miniaturizing the parts which become necessary to be added for an air current setting operation, by utilizing for the controlling of an air current in the interior of a case body a layout on a wiring board for electric parts necessary for a drive unit and for the actuating of the drive unit.

The optical disk apparatus according to the present invention is provided in a wall portion of a case body, in which a wiring board and a drive unit are held, with vent holes and an exhaust hole near which a fan is fixed. The apparatus is also provided with an air current setting element adapted to guide an air current sucked from the vent holes into the interior of the case body by rotating the fan, guide the resultant air current to the fan through an inner portion of the drive unit, and discharge the air current from the exhaust hole. The air current setting element is provided with an air current setting plate fixed to a fan holder secured to the case body and having the fan near the exhaust hole.

According to the optical disk apparatus provided with this structure, a path of a flow of the air current generated in the interior of the case body by the rotation of the fan is controlled in the interior of the case body by the air current setting element. A large quantity of air current controlled in the interior of the case body passes through the interior of the drive unit, and is thereafter discharged to the outside of the case body. Therefore, even when spaces exist on both the left and right sides of the drive unit, the air current occurring in the interior of the case body is used effectively for holding down the generation of heat in the drive unit, so that a cooling effect is improved. According to this invention, a structure in which the air current setting plate as the air current element is fixed to the fan holder secured to the case body and having the fan provided near the exhaust hole is employed. Therefore, the air current setting plate as the air current setting element, if provided additionally, necessarily comes to be provided only in a vacant space on the front side of the fan holder. Moreover, a part (air current plate), if provided additionally for the air current setting purpose, it becomes possible to heighten the cooling effect in the interior of the case body since the part is merely added to the fan holder. This effect is noticeably displayed by employing the structure in which the air current setting plate is fixed to the fan holder and provided in the interior of the case body.

According to the present invention, a structure can be employed in which a vent hole is positioned on one side of a drive unit with an air current plate provided at the back of the drive unit and forming an air reception port opposed to a rear surface of the drive unit. According to this structure, a path of a flow of an air current generated in the interior of a case body is controlled by the air current setting plate, so that the air current becomes easy to be spread in the whole of the interior of the drive unit. Therefore, the effect of holding down the generation of heat by the drive unit is correspondingly noticeably displayed.

According to the present invention, a structure can also be employed in which the width of an air current setting plate extending into the interior of a case body is reduced to thereby increase a distance between the air current setting plate and a drive unit with an electric part which is mounted on a wiring board, and which forms an air current setting element, provided between the air current plate and drive unit. According to this structure, the rationalization of the parts can further be promoted by miniaturizing the air current setting plate, and, in spite of the fact, the controlling of a path of an air current is done by utilizing the layout of the electric parts mounted on the wiring board. Therefore, the controlling of a path of a flow of the air current by the air current setting element comes to be done effectively even when the part, i.e. the air current setting plate additionally provided for carrying out the setting of the air current plate is miniaturized.

The present invention can also employ a structure in which the above-mentioned electric part is a transformer of a height substantially equal to that of a drive unit. According to this structure, the controlling of a path of an air current is done efficiently by utilizing the shape of the transformer. Moreover, the cooling of the transformer, a heat generating part comes to be done efficiently by the air current.

The optical disk apparatus according to the present invention is an optical disk apparatus provided in a wall portion of a case body thereof, in which a wiring board and a drive unit are held, with vent holes and an exhaust hole near which a fan is provided can employ a structure in which the vent holes are positioned in front portions of both the left and right sides of the drive unit with the fan positioned at the back of the drive unit, an air current setting element adapted to guide the air current, which is sucked from the vent holes into the interior of the case body owing to the rotation of the fan, to the same fan through an inner portion of the drive unit, and discharge the resultant air current from the exhaust hole to the outside being provided, the air current setting element including an air current setting plate which is added to a fan holder fixed to the case body and provided with the fan near the exhaust hole, and which is disposed in the interior of the case body, and a transformer as an electric part mounted on the wiring board and positioned in a clearance between the air current setting plate and drive unit, the air current setting plate forming at the back of the drive unit an air reception port opposed to a rear surface of the drive unit, the transformer having a height substantially equal to that of the drive unit. The effect of this invention will be described in detail with reference to a mode of embodiment to be described later.

As described above, since the optical disk apparatus according to the present invention enables the air current flowing through the inner portion of the drive unit to be secured in large quantities, the cooling of a heat generating part, such as a photodiode as a light source incorporated in the drive unit, and the circumferential portion thereof is done efficiently, and the cooling effect is improved. Therefore, various kinds of performance, such as the writing and reading performance of the optical disk apparatus and the durability thereof are improved. Moreover, since it is possible to utilize the layout of the electric parts, such as the transformer mounted on the wiring board for the controlling of a flow path of the air current, the effect of easily promoting the rationalization of parts by miniaturizing the air current setting plate is displayed.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
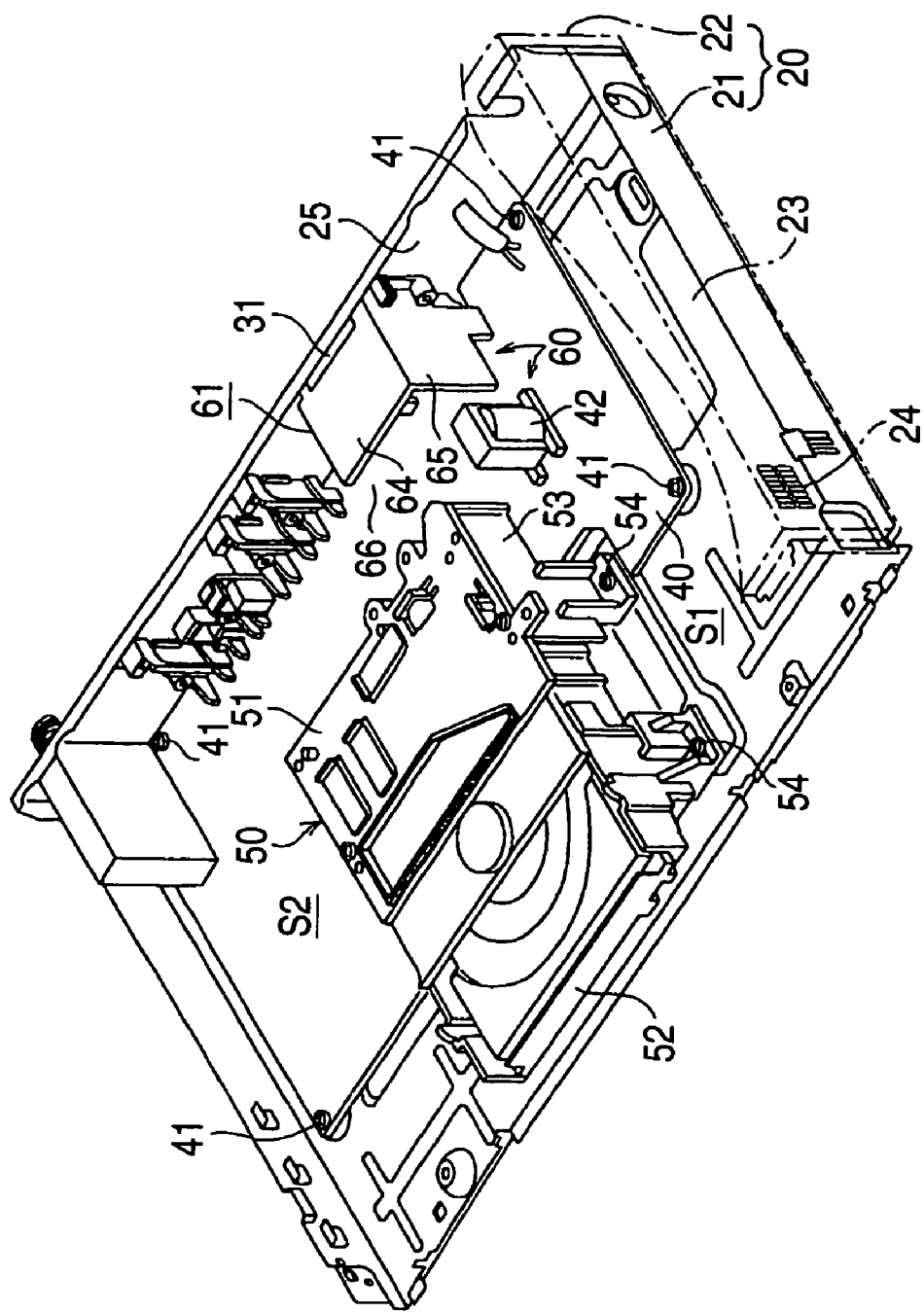
FIG. 1 is a schematic perspective view showing a layout of the parts of the optical disk apparatus according to the present invention.
Figure 2:
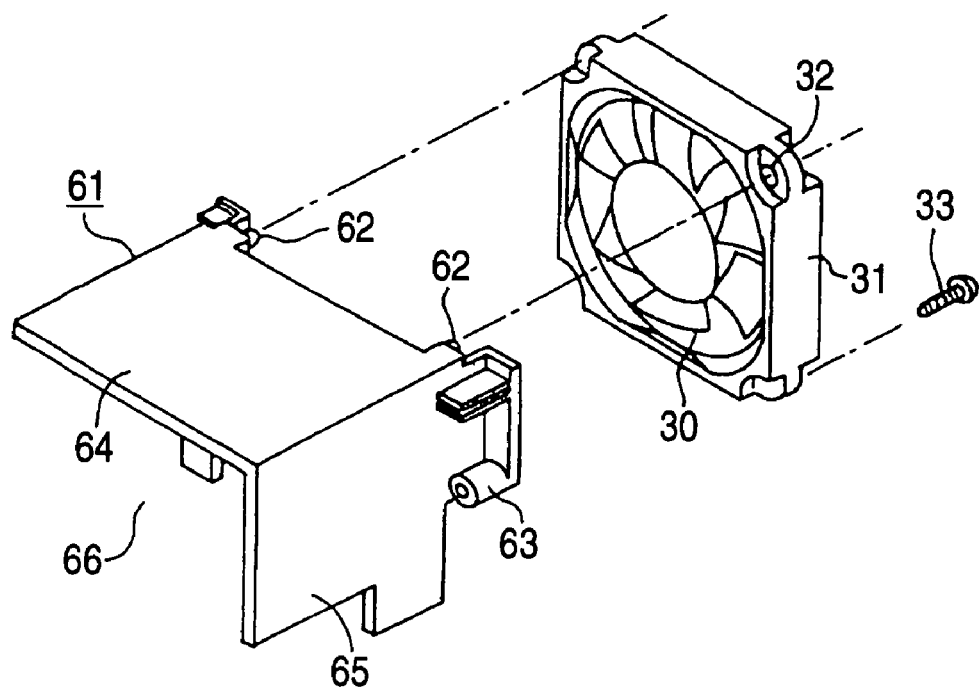
FIG. 2 is an exploded perspective view showing a fan and a fan holder and an air current setting plate.
Figure 3:
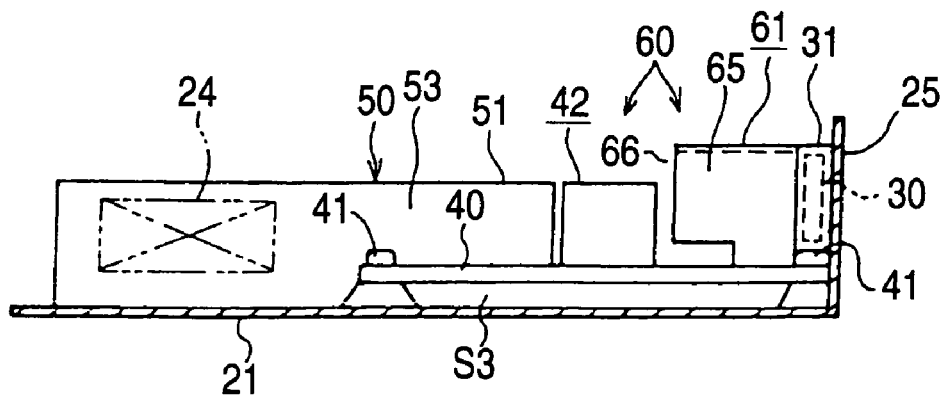
FIG. 3 is a schematic side view of a principal portion of the apparatus.
Figure 4:
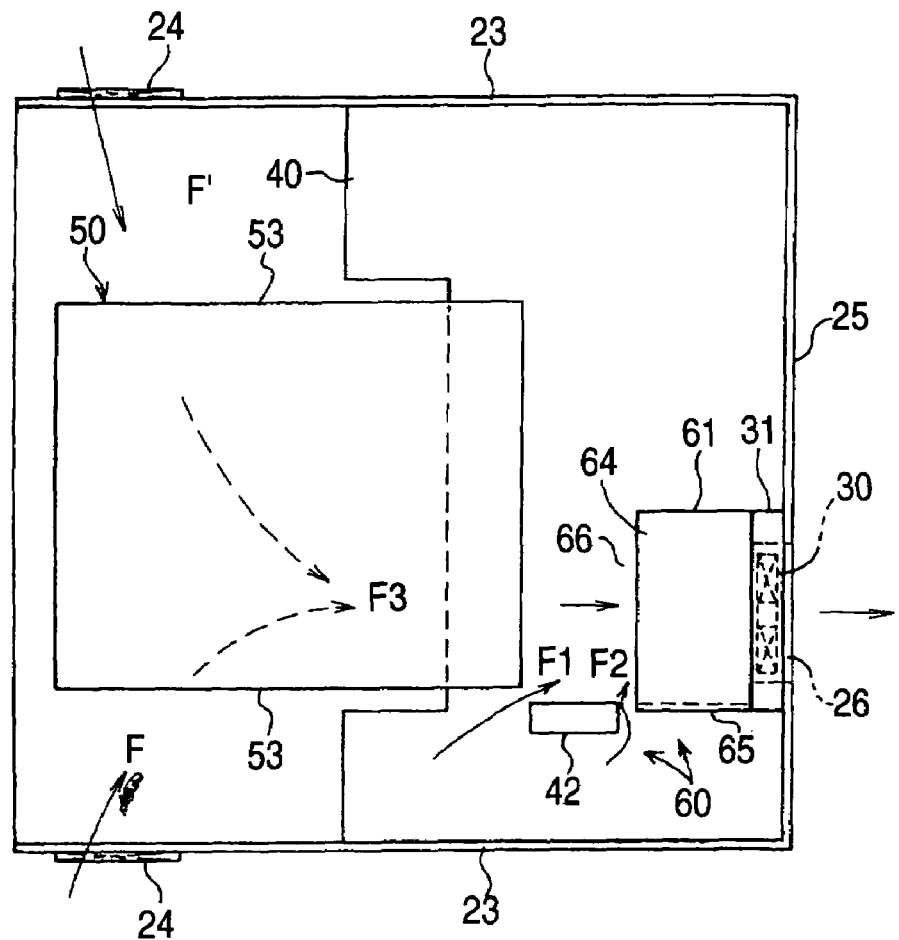
FIG. 4 is a schematic plan view of a principal portion of the apparatus.

FIG. 1 is a schematic perspective view showing a layout of parts of the optical disk apparatus according to the present invention, FIG. 2 an exploded view in perspective showing a fan 30 and a fan holder 31 and an air current setting plate 61, FIG. 3 a schematic side view of a principal portion of the apparatus, and FIG. 4 a schematic plan view of the same.

Referring to FIGS. 1 to 4, a reference numeral 20 denotes a case body, which includes a bottom case 21, a top cover 22 fixed to the bottom case 21, and a front panel (not shown), and has a flat, laterally long rectangular outer shape as a case body. Left and right side wall portions 23, 23 of the case body 20 formed by the top cover 22 are provided at front end sections thereof with vent holes 24, 24 made of a plurality of slits. A rear wall portion 25, which is formed by a rear plate or the bottom case 21, of the case body 20 is provided with an exhaust port 26.

As shown in FIG. 2, a fan 30 is rotatably fixed to a fan holder 31 made of a frame. As shown in FIG. 4, the fan holder 31 is fixed to the rear wall portion 25 by screws, and the fan 30 is thereby provided near the exhaust port 26.

The bottom case 21 holds a wiring board 40 and a drive unit 50 therein. The drive unit 50 is provided with a frame 51 and a disk tray 52 and the like, and holds on the inner side of the frame 51 a lens and a mirror forming an optical system, a turntable on which a disk is mounted, and a turntable-rotating motor and the like besides electric parts and electronic parts, such as a photodiode and the like which constitute heat generating sources. The frame 51 is provided in an upper wall, a lower wall, a front wall and a rear wall thereof with clearances and openings, through which the air on the inner side and outside of the frame can communicate with each other. Although the left and right side walls of the frame are provided with openings in some portions thereof but most of these openings are covered with side walls 53. Moreover, the drive unit 50 is provided substantially in a laterally intermediate portion of the interior of the case body 20 with wide spaces S1, S2 formed on the left and right sides thereof. The drive unit 50 is fixed at a plurality of portions thereof to the bottom plate of the bottom ca-se 21 by fixing screws 54, and a clearance allowing the air to move therethrough is secured between a lower surface of the drive unit 50 and the bottom plate of the bottom case 21. On the other hand, the wiring board 40 is mounted in a predetermined layout with electric parts and electronic parts necessary for actuating the drive unit 50. The wiring board 40 is fixed at a plurality of portions thereof to the bottom plate of the bottom case 21 by fixing screws 41. Moreover, a clearance S3 allowing the air to move therethrough is formed between the wiring board 4 and the bottom plate of the bottom case 21.

In the optical disk apparatus of the above-described construction, the vent holes 24, 24 are positioned at the front sides of both the left and right sides of the drive unit 50, and the fan 30 at the back of the drive unit 50. Therefore, when the fan 30 is rotated to suck the air from the left and right vent holes 24, 24 into the interior of the case body 20, the air sucked into the interior of the case body 20 generates an air current therein, which is discharged by the fan 30 from the exhaust hole 26 to the rear side of the case body 20. In this case, the air current flows through the spaces S1, S1 and clearance S3 in the interior of the case body 20. A part of the air current flows from a clearance and an opening provided in a portion of the frame 51 of the drive unit 50 into the interior thereof, and flows therein. Therefore, the air current occurring in the interior of the case body 20 serves to hold down the generation of heat of the electric parts and electronic parts, such as a photodiode and the like of the drive unit 50 which constitute the heat generating sources, and hold down the generation of heat of the motor.

However, the air current in the interior of the case body 20 flows in larger quantities in the left and right spaces S1, S2 and the like of the drive unit which is a part of a low flow resistance than in the inner portion of the frame 51 of the drive unit 50 which is a part of a high flow resistance. Therefore, the heat generated by the electric and electronic parts, such as the photodiode and the like which constitute heat generating sources of the drive unit 50 is not always held down satisfactorily by the air current occurring in the interior of the case body 20.

In this mode of embodiment, the air current setting element 60 is therefore provided. This air current setting element 60 is provided for the purpose of guiding the air current, which is sucked from the left and right vent holes 24, 24 into the interior of the case body 20, to the fan through the inner portion of the drive unit 50, and discharging the resultant air current from the exhaust hole 26. As shown in FIG. 1, FIG. 3 or FIG. 4, the air current setting element 60 illustrated therein includes the air current setting plate 61 fixed to the fan holder 31 secured to the rear wall 25 of the case body 20, and a transformer 42 as an electric part mounted on the wiring board 40.

This embodiment will be described more in detail. As shown in FIG. 2, the air current setting plate 61 is provided at a rear end portion thereof with positioning projections 62 and fixing bosses 63 with respect to the fan holder 31, and an upper plate portion 64 and a side plate portion 65 provided vertically from one side end of the upper plate portion 64. The positioning projections 62 are fitted in positioning holes 32 of the fan holder 31, and fixing screws 33 inserted through screw holes (not shown) of the rear wall 25 of the case body 20 and screw holes (not shown) of the fan holder 31 are screwed into the fixing bosses 63 and tightened, the air current setting plate 61 being thereby secured the rear wall 25 of the case body 20. In this fixed condition, the air current setting plate 61 is provided in the interior of the case body 20, and the upper plate portion 64 and the side plate portion 65 form an air reception port 66 opened at the front side and one lateral side. The air reception port 66 is opposed at the back of the drive unit 50 to a one-sided portion of a rear surface thereof. When the air current plate 61 is formed to an L-shaped cross section as shown in the drawing, by the upper plate portion 64 and side portion 65, the air current setting plate 61 is serviceable to reinforce the fan holder 31.

In this mode of embodiment, a longitudinal distance between the air reception port 66 and drive unit 50 is increased by setting to a lower level the width of the air current setting plate 61 at which the air current setting plate extends toward the interior of the case body, i.e. the width of the air current setting plate 61 at which the air current setting plate projects from the rear wall 25 of the case body 20 in the forward direction. Thus, the transformer 42, an electric part mounted on the wiring board 40 is provided in the clearance, which is formed owing to the above-mentioned operation, between the side plate portion 65 of the air current setting plate 61 and drive unit 50. This transformer 42 is an example of electric parts needed to actuate the drive unit 50, has a height substantially equal to that of the drive unit 50, and is a heat generating source by itself.

In the optical disk apparatus formed as described above, the side wall 53 of the frame 51 of the drive unit 50, the transformer 42 and the side plate portion 65 of the air current setting plate 61 are arranged in the longitudinal direction, so that the path of the air current occurring in the interior of the case body 20 is controlled by these three kinds of parts. Namely, as shown in FIG. 4, the direct arrival at the fan 30 of a flow F of the air sucked from the vent hole 24 on one side (right side) into the interior of the case body 20 owing to the rotation of the fan 30 is limited by the side wall 53 of the drive unit 52, the transformer 42 and the side plate portion 65 of the air current setting plate 61. Therefore, in the interior of the case body 20, an air current F3 and so forth flowing from the clearances and openings of the frame 51 of the drive unit 50 into the interior of the case body, coming out of the frame 51, passing through the air reception port 66 of the air current setting plate 61 and guided to the fan 30 besides the air flows F1, F2 guided from the clearance between the side wall 53 of the drive unit 52 and the transformer 42 and the clearance between the transformer 42 and the side plate portion 65 of the air current setting plate 61 to the fan 30 through the air reception port 66 of the air current setting plate 61 necessarily occur. In addition, the quantities of the air currents F1, F2 are limited, especially, by the mentioned three parts, and the quantity of the air current flowing into the inner portion of the frame 51 increases. Therefore, the photodiode and motor, heat generating sources incorporated in the drive unit 50 are cooled sufficiently with the air current F1, and the generation of heat thereby is held down sufficiently. The portion of the air current which does not flow into the frame 51 impinges upon the transformer 42, a heat generating source, and the air currents F1, F2 around the transformer 42 contact the same. A sufficient cooling force is thus exerted on the transformer. Accordingly, the air flows occurring in the interior of the case body 20 is sufficiently utilized to cool the drive unit 50 and the photodiode and motor, heat generating sources therefor, and, at the same time, sufficiently to cool the transformer 42, the heat generating source mounted on the wiring board 40, and, as a whole, an excellent cooling effect is displayed by the fan 30.

On the other hand, an air current F' sucked from the vent hole 24 on the other side (left side) into the interior of the case body 20 in accordance with the rotation of the fan 30 passes through the inner and outer portions of the drive unit 50 in the interior of the case body 20, and reaches the fan 30 via the air reception port 66 (refer to FIG. 1) of the air current setting plate 61, the resultant air current being discharged from the exhaust port 26 to the outside. Therefore, this air current also serves to cool the electric parts and electronic parts mounted on the drive unit 50 and wiring board 40.

Although a description of an example in which the air current setting element is made of the air current setting plate 61 and the transformer 42 as an electric part was given in the above-described mode of embodiment, it is also possible to form the air current setting element 60 by the air current setting plate. An example of this structure will now be described with reference to FIG. 5.

Figure 5:
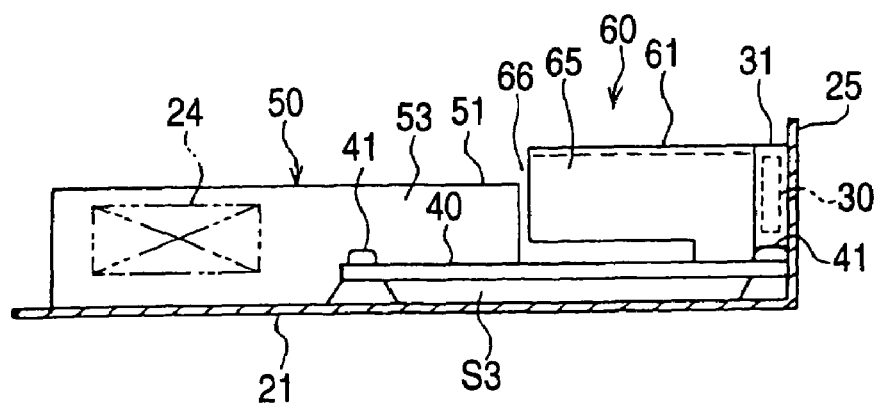
FIG. 5 is a schematic side view of a principal portion of the optical disk apparatus in another mode of embodiment.
Figure 6:
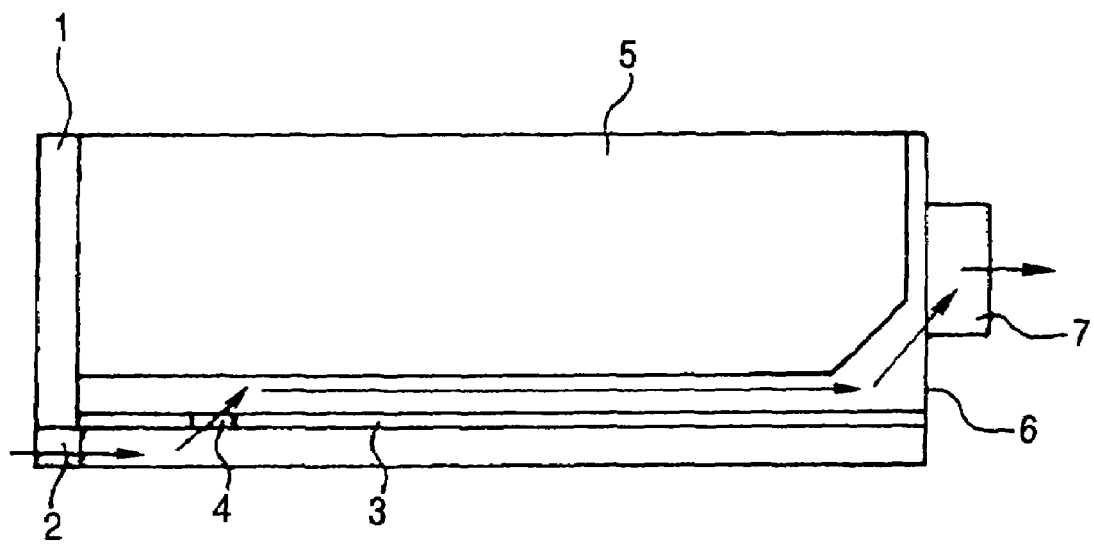
FIG. 6 is an explanatory drawing showing the conception of a related art example.
Figure 7:
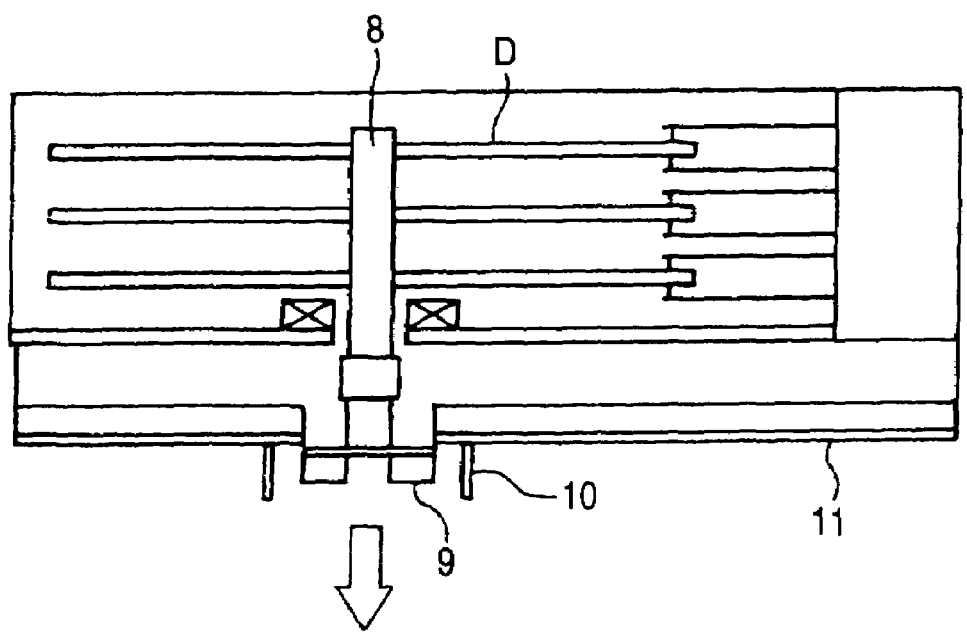
FIG. 7 is a schematic sectional view of another related art example.

FIG. 5 is a schematic side view of a principal portion of another mode of embodiment of the optical disk apparatus. This mode of embodiment is an example in which such a transformer 42 as is shown in FIG. 1, FIG. 3 and FIG. 4 cannot be positioned between a drive unit 50 and an air current setting plate 61 due to the layout of various kinds of electric parts and electronic parts on a wiring board 40. In this case, it is desirable that the current setting plate 61 be positioned close to a drive unit 50 by increasing the width at which the air current setting plate 61 extends into the interior of a case body. When the width of the air current setting plate 61 is thus set large, the air current setting plate displays the effect of controlling the air current occurring in the interior of the case body 20, and the quantity of the air current flowing into an inner portion of the frame 51 of the drive unit 50 increases. Therefore, a photodiode and a motor, heat generating sources incorporated in the drive unit 50 are cooled sufficiently with the air current, and the heat generated by the same parts is held down sufficiently.

A case where the air current plate 61 and the transformer 42 are included in the air current setting element 60 as in the mode of embodiment described with reference to FIG. 1 to FIG. 4, and a case where the air current plate 61 only is included therein will be compared with each other. In the former case, the air current setting plate 61 is miniaturized correspondingly to the reduced level of the width thereof as compared with the width of the same part in the latter case. Therefore, in the former case, the miniaturization of the air current setting plate 61 is promoted, and the cost of the material for the same part becomes low.

Besides, the above advantageous effect is realized by using the transformer as well as by using various kinds of electric parts that has a height substantially equal to that of the drive unit 50.

Further, the transformer or the various kinds of the electric parts can be provided not only one side of the air current as shown in FIGS. 1, 3 and 4, but also both sides of the air current.

In each of the modes of embodiments described above, the exhaust port 26 near which the fan 30 is provided in the intermediate portion of the rear wall portion 25 of the case body 20 or the portion thereof which is slightly offset from the intermediate portion thereof. Concerning the matter, it is also possible that the exhaust port be provided in either a left end section or a right end section of the rear wall portion of the case body.

Further, in each of the modes of embodiments described above, the vent holes 24, 24 are positioned at both the left and right sides of the drive unit 50. Concerning the matter, it is also possible that the vent holes be provided in the front side of the drive unit 50.

What is claimed is:

1. An optical disk apparatus comprising:
   vent holes;
   an exhaust hole; and
   an air current setting element, wherein:
   the vent holes and the exhaust hole in which a fan is provided are formed in a wall portion of a case body, in which a wiring board and a drive unit are held;
   the vent holes are positioned in front portions of both the left and right sides of the drive unit, the fan positioned at the back of the drive unit, an air current setting element adapted to guide the air current, which is sucked from the vent holes into the interior of the case body owing to a rotation of the fan, to the fan through an inner portion of the drive unit, and discharge the air current from the exhaust hole to the outside being provided; and
   the air current setting element including an air current setting plate which is added to a fan holder fixed to the case body and provided with the fan in the exhaust hole, and which is disposed in the interior of the case body, and a transformer as an electric part mounted on the wiring board and positioned in a clearance between the air current setting plate and the drive unit, the air current setting plate forming at the back of the drive unit an air reception port opposed to a rear surface of the drive unit, the transformer having a height substantially equal to that of the drive unit.

2. An optical disk apparatus comprising:
   vent holes;
   an exhaust hole; and
   an air current setting element, wherein:

the vent holes and the exhaust hole in which a fan is provided are formed in a wall portion of a case body, in which a wiring board and a drive unit are held; and the air current setting element guides an air current which is sucked from the vent holes into the interior of the case body owing to the rotation of the fan, to the fan through an inner portion of the drive unit, and discharge the air current from the exhaust hole, the air current setting element being provided with an air current setting plate attached to a fan holder fixed to interior of the case body.

3. The optical disk apparatus according to claim 2, wherein the vent holes are positioned on side portions of the drive unit, the air current plate forming an air reception port at the back of the drive unit and opposed to a rear surface of the drive unit.

4. The optical disk apparatus according to claim 3, wherein a distance between the air current setting plate and drive unit is increased by reducing a width at which the air current setting plate projects into the interior of the case body, the electric part mounted on the wiring board and forming the air current setting element with the air current setting plate being provided between the air current setting plate and drive unit.

5. The optical disk apparatus according to claim 4, wherein the electric part is a transformer having a height substantially equal to that of the drive unit.

* * * * *